Sept. 21, 1943. H. HOOVER, JR., ET AL 2,329,721
GEOPHYSICAL EXPLORATION SYSTEM
Filed Sept. 30, 1938 5 Sheets-Sheet 1

INVENTORS,
HERBERT HOOVER, JR.
CHARLES GILL MORGAN.
NORMAN J. CHRISTIE.

ATTORNEYS:
Lippincott & Metcalf

Sept. 21, 1943.    H. HOOVER, JR., ET AL    2,329,721
GEOPHYSICAL EXPLORATION SYSTEM
Filed Sept. 30, 1938    5 Sheets-Sheet 2

INVENTORS,
HERBERT HOOVER, JR.
CHARLES GILL MORGAN.
NORMAN J. CHRISTIE.
ATTORNEYS:
Lippincott & Metcalf Sept. 21, 1943.    H. HOOVER, JR., ET AL    2,329,721
GEOPHYSICAL EXPLORATION SYSTEM
Filed Sept. 30, 1938    5 Sheets-Sheet 3

INVENTORS,
HERBERT HOOVER, JR.
CHARLES GILL MORGAN.
NORMAN J. CHRISTIE.
ATTORNEYS:
Lippincott & Metcalf Sept. 21, 1943.   H. HOOVER, JR., ET AL   2,329,721
GEOPHYSICAL EXPLORATION SYSTEM
Filed Sept. 30, 1938   5 Sheets-Sheet 4

INVENTORS,
HERBERT HOOVER, JR.
CHARLES GILL MORGAN.
NORMAN J. CHRISTIE.
ATTORNEYS:
Lippincott & Metcalf Sept. 21, 1943.   H. HOOVER, JR., ET AL   2,329,721
GEOPHYSICAL EXPLORATION SYSTEM
Filed Sept. 30, 1938   5 Sheets-Sheet 5

INVENTORS,
HERBERT HOOVER, JR.
CHARLES GILL MORGAN.
NORMAN J. CHRISTIE.
ATTORNEYS:
Lippincott & Metcalf Patented Sept. 21, 1943

2,329,721

UNITED STATES PATENT OFFICE 2,329,721

GEOPHYSICAL EXPLORATION SYSTEM

Herbert Hoover, Jr., Sierra Madre, Charles Gill Morgan, Pasadena, and Norman J. Christie, Whittier, Calif., assignors, by direct and mesne assignments, to Consolidated Engineering Corporation, Los Angeles, Calif., a corporation of California Application September 30, 1938, Serial No. 232,534

9 Claims. (Cl. 181—0.5)

Our invention relates to geophysical prospecting, and more particularly to an improved method of continuous subsurface exploration.

In conducting seismic exploration in California and many other areas, it has long been maintained that continuous subsurface exploration could not be done successfully, or when successful, it was not economical. As a result, geophysicists in these areas have resorted to the use of the less accurate and thereby less reliable system of seismic exploration known as "dip shooting."

The failure of continuous subsurface surveying in many areas, such as some found in California, have been ascribed to the irregular character of the sedimentary deposits, the existence of accentuated lensing and pinching out of beds and the fact that the lithologic character of the beds varies greatly from point to point in a lateral direction. The lateral changes in lithology may be due to variations in the mineral constituents or to physical conditions such as cementation, moisture content, compaction, et al., thus causing marked changes in the elastic properties of a given bed throughout a given area. In the Mid-Continent, there is such high contrast between the elastic properties of many of the strata that reflected waves may be properly correlated even though they be recorded miles apart without any intermediate tie. But the vertical changes in the elastic properties of deep subterranean deposits in many areas, as in California, are comparatively small so that small lateral changes in the stratigraphy have a profound effect on the character of the reflected waves. Because of the comparatively rapid variations in the thickness and physical nature of the beds from point to point beneath a line of exploration in such an area, the character of the seismic waves reflected from a given underlying stratum also varies greatly.

Another reason for the failure of continuous subsurface exploration in many areas is the fact that where dips are high, and consequently the angle of incidence varies greatly from trace to trace on the seismograph record, the character of the reflected waves changes rapidly, due to this factor alone.

Due to the improved system of continuous subsurface exploration which we have invented, we have overcome the obstacles which have heretofore prevented the successful and economical application of continuous subsurface exploration in such areas difficult to survey.

The principal object of our invention, therefore, is to provide a method of continuous subsurface exploration which will operate successfully in difficult as well as simple areas.

Another object of our invention is to provide a system of continuous subsurface exploration in which it is possible to follow reflections from beds within a given formation from trace to trace in spite of change of character of the beds or the waves.

Another object of our invention is to provide a system for overlapping waves received at the surface by different receptors, in such a manner that "ground roll," consisting of surface or L waves, is substantially reduced in amplitude compared with other waves.

Another object of our invention is to provide a system for obtaining continuous subsurface surveying and three-dimensional control simultaneously, thereby making possible the accurate determination of strike and dip of the horizon being identified from record to record.

Another object of our invention is to provide a system for the reduction of ground roll without introducing electrical overlapping, which may produce undesirable cross-feed of energy between recording channels unless properly applied, as in co-pending applications of Herbert Hoover, Jr., for United States Letters Patent on "Improvements in geophysical prospecting receptor circuits," Serial No. 202,752, filed April 4, 1938, and on "Geophysical prospecting receptor circuits." Serial No. 164,100, filed September 16, 1937.

Referring to the drawings:

Figs. 1, 2, 3 and 4 are schematic plan views of various pattern modifications of one form of our invention.

Fig. 7 is a pattern diagram showing a preferred embodiment of our invention for continuous contouring.

Figs. 13, 14, 15 and 16 illustrate patterns of our invention, with all the receiving stations in one straight line parallel to a straight line of generating stations.

Figs. 17, 18, 19, 20, 21 and 22 illustrate several of our patterns which may be used for obtaining three-dimensional control simultaneously with continuous subsurface exploration.

Figure 6:
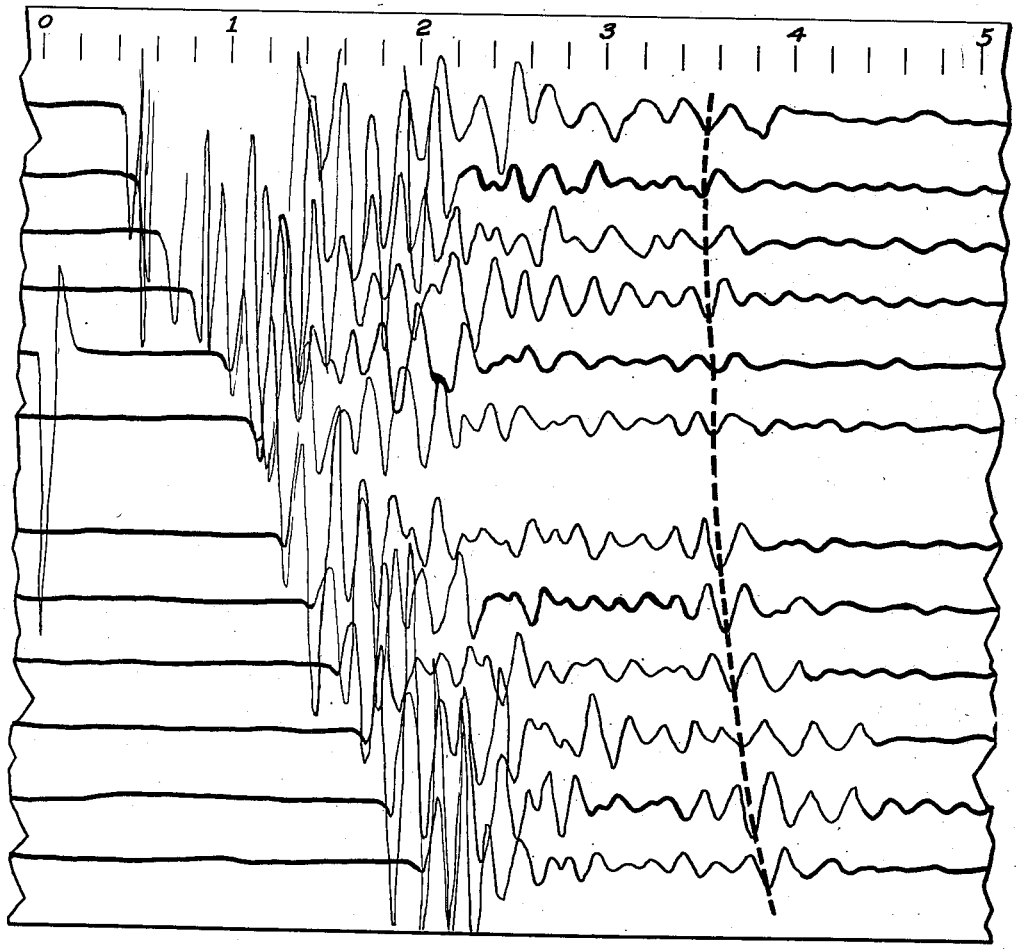
Fig. 6 is an example of a record obtained by applying seismic prospecting methods of the prior art.

In the patterns illustrated receptor gravity centers are indicated by dots, and the surface projection of a generating point by an X. It is to be understood that the actual shot points are preferably below the weathered layer of the ground.

In general, geophysical exploration is conducted by establishing generating stations and receiving stations, producing physical disturbances in the earth at the generating stations, and recording the effects that such disturbances produce at the receiving stations.

In the most effective method of geophysical exploration, use is customarily made of earth disturbances in the form of artificially created seismic waves. Usually these seismic waves are created by detonating a single charge of explosive below the weathered layer of the ground. In some cases, however, multiple shots at a plurality of related points are fired simultaneously or in timed sequence. Sometimes acoustic waves are used instead of seismic waves. In this application the two terms "acoustic waves" and "seismic waves" are used synonymously.

The term "seismic wave generating station" therefore indicates means for generating at any point or plurality of points at which a single seismic wave or a spatially or temporally related group of seismic or acoustic waves, and may be conveniently designated herein by the letter S, together with an exponent determining its position in a pattern.

In the seismic method the receivers, or receptors (hereinafter sometimes referred to as receiving stations), used to detect the disturbances may be of the form of seismometers, geophones, acoustic receivers, or any other suitable vibration pickup. A seismometer which is particularly useful for seismic exploration is shown in copending patent application Serial No. 287,073, by Herbert Hoover, Jr. As regularly practiced, electrical waves converted from arriving earth waves at the receivers are amplified electrically, transmitted, and recorded as oscillograph traces on photographic paper, usually several on a single strip. Frequently the outputs from several receptors are combined in some manner before the recording. The point in space representing the center of gravity of the receptor is designated by the letter R, together with a subscript denoting position in a pattern.

It is to be understood that the patterns herein to be described are based on a fundamental concept of a hypothetical planar subsurface stratum. However, all patterns laid out above the surface of the ground over unknown subsurface structures before knowledge thereof will, when the actual conditions do not coincide with the hypothetical premises, give results corresponding with the actual conditions, thus allowing the survey to be accomplished.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Fig. 6 shows a typical record obtained in easy shooting territory with a prior type of seismic prospecting method. In this record the character of the waves changes but slightly from one receiving point to the next, so that the correlation of waves from trace to trace is very easy. A series of correlated waves is joined by a broken line M.

In a widely used method of continuous subsurface exploration, a series of such records was made by using a continuous series of spreads of receivers positioned on a line of shot points. In this system waves generated at each shot point were recorded at a spread of receivers extending from said shot point to the neighboring shot point. Such a method is described on pages 53 and 54 of an article entitled "The discovery of reflection seismograph of a small producing structure in Okmulgee County, Oklahoma," by G. H. Westby, published in July, 1935, in vol. IV, No. 1 of The Journal of the Society of Petroleum Geophysicists.

There are several points of interest in connection with this prior shooting technique. Most important of all is the fact that for the records obtained successively along the line, there exist wave-travel paths and reflection points which are so close to each other that the recognition of waves from one record to the next is extremely simple.

By shooting continuously in the manner described in the Westby article, important changes in dip and faulting may be determined.

When attempts are made to apply this prior method, however, to areas having beds of rapidly changing lithologic character, it is often difficult and frequently impossible to trace a reflected wave from a subsurface bed from trace to trace when exploration is conducted according to the procedure outlined above. In many areas the character of the surface is such that the waves received at the receptors adjacent the shot-holes are completely masked by surface vibrations and noise from the generating point. For this reason the waves received at a receptor at the shot point position, are not easily identifiable, and hence there is a resultant lack of continuity in the identification of waves reflected from the subsurface. In areas of rapidly changing lithologic character this may result in mistaking reflections from one bed on a first set-up for those from another bed on an adjacent set-up.

In order to circumvent these difficulties and thereby make continuous subsurface exploration possible in otherwise difficult areas, we have applied new principles. These are illustrated in Figs. 1 to 5 and Figs. 7 to 22.

Figure 1:
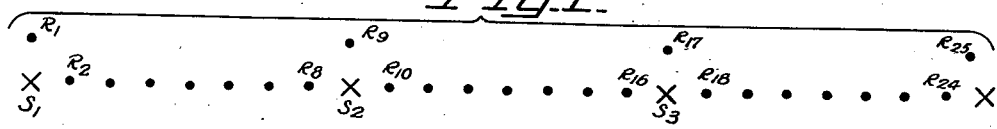
Figure 5:
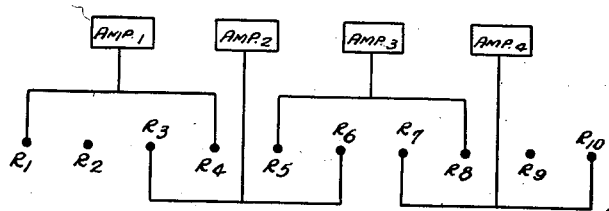
Fig. 5 is a schematic view of a preferred method of combining receiver outputs.
Figure 8:
Figs. 8, 9, 10, 11 and 12 illustrate various other patterns our invention may take, with most of the receivers in the same line with the generating stations.
Figure 9:
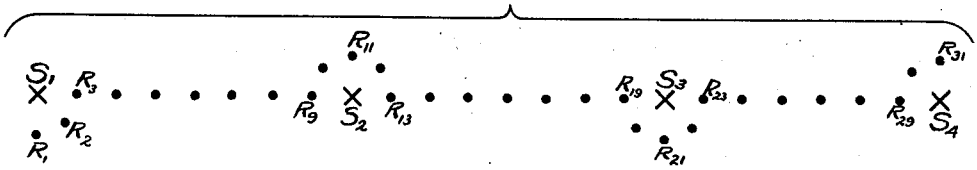
Figure 10:
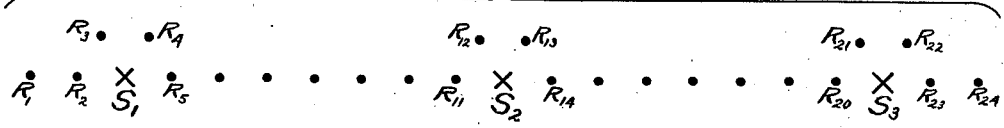

In Fig. 1 we have illustrated how the undesirable effects of shot-hole disturbances may be reduced by offsetting the receptors adjacent the shot-hole from the main line of receptors and connecting them with a chain of receptors, preferably along the line joining the shot-holes.

The amount of offset required to produce records free of shot-hole disturbances varies greatly in different areas. As pointed out above, there are some areas in which the disturbances from the shot-hole are not great enough to prevent using a receiving point right at the shot point or within a few feet of it. In other areas, however, any receptor within as much as seventy-five or a hundred feet, or even more, is so much affected by disturbances from the wave generator that reflected waves cannot be identified on the record obtained.

In addition to avoiding shot-hole disturbances there is another important reason for not placing a receptor right above the shot. In many areas we have observed that when a shot is fired in or below the weathered layer, the shattering of the earth material causes a considerable reduction in the velocity of seismic waves therethrough. In such cases ordinary weathering techniques fail to give the correct depth of the weathered layer below a receiving point close to the generating point. Such changes of velocity resulting from fracturing the earth results in time delays in the wave arrival by as much as five and sometimes twenty-thousandths of a second, depending on the size of the charge and the particular earth material present. This effect tapers off with distance from the shot-hole. In some cases we have observed that the receptors must be offset from the shot-hole as much as 25 or 50 feet in order to make errors from this source negligible. For brevity this phenomenon of velocity change resulting from this fracture may be termed the "corona effect."

In Fig. 2 is shown a system similar to that shown in Fig. 1, but a plurality of receptors is used in place of single receptors. In this case the plurality of receptors is illustrated by a pair, the receptors of each pair being placed apart approximately half a wave length of the ground waves, which may have a wave length of from 20 to 200 feet, so that when their outputs are applied to the same amplifier and recording element, the amplitude of the ground wave is largely reduced compared with other waves. In case there are undesirable waves of two or more wave lengths present they may both be reduced by utilizing well known principles of wave interference.

In the arrangement of Fig. 2, however, ground waves arriving at a pair of receptors, say $R_9$, from a distant shot-hole, say $S_3$, do not cancel out. In many areas the ground wave may be so diminished in amplitude over such a distance that it will not mask the reflected waves. In other cases, however, the ground wave from a given shot-hole will still have large amplitude at the neighboring shot-holes. This difficulty has been overcome by arranging a group of receptors at the offset receiver position in such a manner that it is substantially insensitive to ground roll from either of two different directions. This is illustrated, for example, by the two embodiments of Figs. 3 and 4.

In Figs. 3 and 4 we have illustrated, by way of example, arrangements of four receptors offset from the shot-holes in such a way that substantial cancellation of the ground wave will be produced for two approximately perpendicular directions. With these arrangements ground waves received at receptor position $R_9$ from shots at $S_1$, $S_2$ or $S_3$ are considerably reduced. The spacing of these receptors is made in accordance with well known principles of wave interference. If desired, the receptor groups in Figs. 2 to 4 may contain larger numbers of receptors arranged to product substantial cancellation of ground roll.

In many cases offsetting the receptor or receptor group alone is sufficient to provide continuous subsurface coverage. By so offsetting the receptors the non-recognition of common recordings for set-ups of adjacent shot-holes and reflected from substantially incidence points on the reflecting bed is obviated, and there is less danger of mistaking reflections from one bed for those from another. Frequently, however, the spacing between adjacent receptors or receptor groups is too great for the positive identification of waves which are changing in character from point to point, especially where this change in character is rapid. In order to overcome this latter difficulty we have increased the number of receptors and decreased the distance between the receptor groups. In many cases we have also diminished the distance between shot-holes to some extent. Heretofore shot-holes have ordinarily been placed from a half to a mile apart, but this is not satisfactory in very complex territory.

In some cases we have found that satisfactory results can be obtained economically by spacing the shot points as little as 500 feet apart and diminishing the distance between receiving positions to as low as 30 feet. In an ideal system for use in extremely complex territory it would be desirable to increase the number of receiving positions indefinitely so that they are just a few feet or even a few inches apart. However, this is not a practical or economical solution of the problem. Heretofore, the minimum receptor interval used in continuous subsurface exploration has been about 120 feet. This of course is satisfactory in the Mid-Continent, and some parts of Texas, and other easy shooting regions. Repeated attempts to use this latter distance in many parts of California and other complex territories have failed. In California it was recognized that even in dip shooting it was necessary to plant the receptors closer together, but it was considered impractical and uneconomical to use this closer receptor planting in continuous subsurface exploration.

Up to the time of our invention the largest number of channels used in one recording unit in seismic exploration was twelve. It was considered uneconomical to use more. The result was that continuous subsurface exploration in California-type areas was uneconomical and never practiced.

By increasing the number of recording channels and thereby making possible reduction of the receptor interval, we found it was not only possible but also economical to conduct continuous subsurface exploration in such areas.

In order to further increase the recognizability of reflections from trace to trace, we have adopted a system of spatial overlap. To understand this part of our invention consider a line of receptors $R_1$ ... $R_8$ in Fig. 5. The outputs from receptors $R_1$ and $R_4$ are combined and applied to a single amplifier Amp. 1. Similarly, the inputs for amplifiers Amp. 2, Amp. 3, Amp. 4, etc., are obtained by combining outputs of receptors as shown. In this way an effect that is more or less an average over a large region is recorded on a single channel so that rapid lateral changes in lithologic character are averaged out and the recognition of waves from the same horizon from trace to trace is greatly facilitated. If desired, sets of a larger number of receptors can be planted in any suitable manner to provide substantial overlap of the subsurface areas from which the reflections arise and the outputs from the receptors in each set combined, and the combined output for each set applied to a separate recording channel.

In pursuing our invention, shots may be made for recording at receptors on one or both sides of the shot point. For convenience we may refer to a recording made at a pattern of receiver positions on one side of a generating station as "unilateral," and a recording made at a pattern of receiver positions on both sides of a generating station as "bilateral."

The expression "substantially unilateral" is used to describe any receiving station pattern in which a large number of said receiving stations in a spread lie substantially on one side of the generating station and one or more receiving stations lie on the other side.

For example, using the patterns of Figs. 1 to 4, we may shoot as follows:

*Method 1*

| Set-up | Shot at shot point | Receptors at which waves are recorded simultaneously |
| --- | --- | --- |
| 1 | $S_1$ | $R_1 \ldots R_9$ |
| 2 | $S_2$ | $R_1 \ldots R_9$ |
| 3 | $S_2$ | $R_9 \ldots R_{17}$ |
| 4 | $S_3$ | $R_9 \ldots R_{17}$ |
|  | etc. |  | or as follows:

*Method 2*

| Set-up | Shot at shot point | Receptors at which waves are recorded simultaneously |
| --- | --- | --- |
| 1 | $S_1$ | $R_1 \ldots R_{17}$ |
| 2 | $S_2$ | $R_9 \ldots R_{25}$ |
|  | etc. |  |

In the first series of shots using unilateral set-ups, two shots are taken at each shot point except those on the end. If desired, a spread of receptors may be planted outside the line of shots and two shots taken at the end shot points as well.

In the second method a bilateral pattern is used so that only one shot is taken per shot point, in this manner greatly improving the accuracy of the data by helping to insure positive identification of waves from a given bed received on opposite sides of the generating stations. This improvement in result originates from the fact that the wave-form from one shot to the next, even in the same hole, varies to at least some extent, as is well known; by shooting bilaterally this variation from shot to shot in the same hole is eliminated. From the travel times of the waves for the shot points to the associated receptors the depth and dip of the formation may be determined by well known methods. By using such a process there will always be a trace on each record of substantially the same travel time, and reflected from very near the same point as for a trace on a record taken adjacent to it.

Sometimes it is necessary to join the offset receptors with the receptors in the shot-hole line by one or more additional receptors. If this is not done, it may be very difficult to identify the proper wave on the traces obtained from the offset receptors. One simple way to accomplish the desired result is shown in Fig. 11.

In order to carry out our invention it is not necessary to place the offset receptors on a line perpendicular to the line of exploration at the generating points. We may, if we wish, lay out a line of shot-holes and place a line of receiving stations between each successive pair of shot-holes, as in Figs. 10, 11 and 12. These lines of receiving positions intermediate the shot-holes terminate in receiving positions far enough from the shot-holes so as not to be disturbed by ground vibration or noise from the shot-hole. For convenience we shall call such a spread an "intermediate line of receiving stations." Then two receiver positions, such as the end receiver position as $R_{11}$ and $R_{14}$ of each line on the two sides of a shot-hole $S_2$ of Figs. 11 and 12, are joined by a chain of receptors spaced closely enough together to permit recognizing waves reflected from a given bed from trace to trace. Each receiver position in the chain, however, is placed far enough from the shot-hole so that noise and other undesirable vibration from the shot-hole will not disturb receptors placed at such positions.

In adopting such patterns we may vary the spread used in many ways. Considering one shot point alone, as for example $S_2$ in Figs. 11 and 12, we may record waves from a single shot received at any one of the following group of receiving stations: $R_2 \ldots R_{15}$ or $R_2 \ldots R_{14}$; $R_3 \ldots R_{13}$; $R_4 \ldots R_{12}$; $R_1 \ldots R_{24}$ or $R_2 \ldots R_{23}$; $R_3 \ldots R_{22}$; and variations of these patterns. Considering just one pattern, suppose waves received at $R_2 \ldots R_{23}$ are recorded for a shot from $S_2$, and waves received at $R_{11} \ldots R_{32}$ are recorded for a shot at $S_3$. In this case there is actual overlap of the incidence points on the reflecting horizon. This arrangement has the additional advantage that if there is any peculiar discontinuity in this overlapped region this anomaly will appear on two records. Any irregularity at incidence points corresponding to the tie-in receiving positions as $R_9$ in Figs. 1, 2, 3 and 4 will not impair the results, as there are overlapping incidence points to provide a complete check on the data. The time that would be occupied for a wave to travel from $S_2$ to the reflecting horizon and to a receiver at an adjacent shot point, as $S_1$ or $S_3$, may be determined by interpolation.

Figure 11:
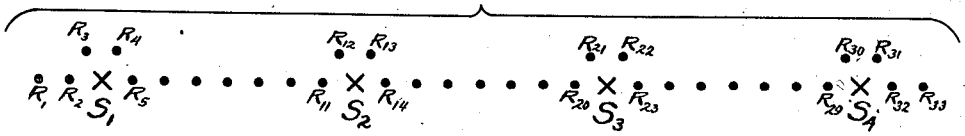
Figure 12:
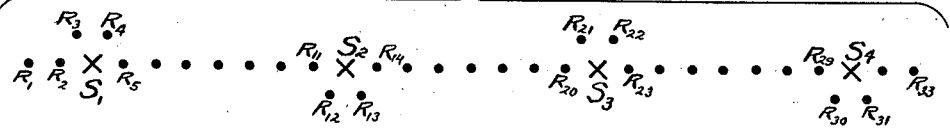

Referring to Fig. 11, we may conduct continuous profiling according to one of the following procedures or many variations therefrom:

*Method 3*

| Set-up | Shot at shot point | Receptors at which waves are recorded simultaneously |
| --- | --- | --- |
| 1 | $S_1$ | $R_2 \ldots R_{14}$ |
| 2 | $S_2$ | $R_2 \ldots R_{14}$ |
| 3 | $S_2$ | $R_{11} \ldots R_{23}$ |
| 4 | $S_3$ | $R_{11} \ldots R_{23}$ |
|  | etc. |  |

*Method 4*

| Set-up | Shot at shot point | Receptors at which waves are recorded simultaneously |
| --- | --- | --- |
| 1 | $S_1$ | $R_3 \ldots R_{13}$ |
| 2 | $S_2$ | $R_3 \ldots R_{13}$ |
|  | etc. |  |

*Method 5*

| Set-up | Shot at shot point | Receptors at which waves are recorded simultaneously |
| --- | --- | --- |
| 1 | $S_2$ | $R_3 \ldots R_{13}$ |
| 2 | $S_3$ | $R_{11} \ldots R_{23}$ |
|  | etc. |  |

*Method 6*

| Set-up | Shot at shot point | Receptors at which waves are recorded simultaneously |
| --- | --- | --- |
| 1 | $S_2$ | $R_3 \ldots R_{13}$ |
| 2 | $S_3$ | $R_{12} \ldots R_{21}$ |
|  | etc. |  |

Similar procedures may be used with any of the other patterns. Methods 1, 3 and 4 are unilateral; methods 2, 5 and 6 are bilateral.

These modifications of our invention therefore comprise laying out a line of seismic wave generating stations, establishing intermediate lines of receiving stations between the successive generating stations, establishing chains of receiving stations joining successive intermediate lines of receiving stations so as to form a continuous chain of receivers, then generating waves at successive stations and recording the waves received at suitable groups of receiving stations so as to provide continuous coverage of the underlying strata. In the preferred embodiments of this form of our invention the intermediate lines of receiving stations lie wholly on the line of generating stations.

Satisfactory results may be obtained by shooting at a given generating station and recording at an adjacent spread, and shooting again at the same position and recording at an adjacent spread on the other side, and repeating the process at other generating stations down the line in such a manner that there is a continuous chain of incidence points on a hypothetical flat subsurface bed, or in such a manner that the chains of incidence points corresponding to each shot-hole overlaps the chain of incidence points from a neighboring shot-hole.

An advantage in placing receiving stations on the line of shot-holes lies in the fact that in such an arrangement it is very easy to provide for cancellation of ground roll, as cancellation in two opposite directions only is required. This may be done by using pairs of receivers as for the intermediate lines of receivers in Fig. 2. Another advantage in placing the receiving stations on the line of shot-holes lies in the fact that in rough territory it is especially desirable to place the shot-holes and receiving positions along the same line which very frequently is a road. In this way it is necessary to cut into the brush or woods for only a few receiving positions.

Figure 14:
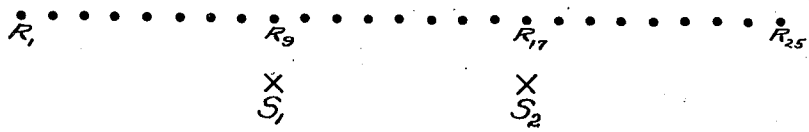
Figure 13:
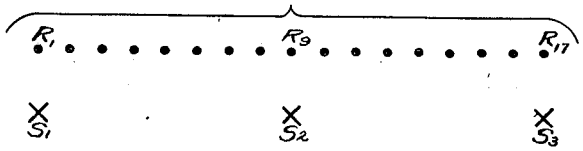

Other embodiments of our invention are shown in Figs. 13, 14, 15 and 16. In these figures the receiving positions are placed in straight lines parallel to the line of generating stations. This type of set-up is especially convenient wherever local laws forbid the drilling of shot-holes near roads. The receptors may be placed beside the road and shot-holes offset therefrom. This overcomes the difficulty of cutting away brush, etc., along an entire line of exploration for planting the receivers using these patterns. It is necessary to cut out only short surface paths to the generating points. As illustrated in Figs. 13 and 14, there is a receiver station opposite each shot-hole. In Figs. 15 and 16, the position opposite each shot-hole separates two receiving positions. Using these arrangements, records are made according to the principles already discussed, using either one or two shots per generating station according to whether or not unilateral, substantially unilateral or bilateral spreads are used.

In any of these patterns the receptors should be placed close enough together to permit the recognition of corresponding waves from trace to trace; in difficult areas they should be less than 100 feet apart, and in very difficult areas less than 50 feet apart. Where needed, provision should be made for cancellation of ground roll in one or more directions. Where lithologic character varies rapidly from point to point, spatial or electrical overlap may be utilized to advantage.

The size of the gap between portions of the subsurface explored should preferably be equal to or less than the distance between successive incidence points within the same record. However, when the wave-form varies but slightly from trace to trace on a given record, as frequently occurs in easy shooting territory, the gap may be larger.

The computation of the dip and depth of the reflecting beds may be made in several ways. They may be made from the travel times to the receptors in the offset receiver positions, or they may be made from the travel times to the receptors at the end receiving positions along the shot line.

The required computations of weathering corrections may be made by principles well known to those skilled in the art.

By applying our method for obtaining positive correlation from trace to trace and record to record, waves reflected from a given bed may be followed along a line of exploration, and by appropriate arithmetic computations the difference in the travel times to the subsurface bed at the two ends of the line of exploration can be computed. Knowing the velocity of the waves, it is possible to compute the distance from each shot point to the reflecting horizon.

By using any of the embodiments of our method described, so far, the in-line component of dip (that is, the component of dip in the wave travel plane) at each shot point can be determined. Wherever the cross-line component of dip (that is, the component of dip in a plane perpendicular to the wave travel plane) is small, or constant from one set-up to another, the relative depths of a reflecting horizon can be computed at various points along the line and valuable information obtained therefrom.

However, the cross-line component of dip is not always so small that it can be neglected in the computation of depth. Whenever the cross-line component of dip differs at two shot points, these values must be known in order to determine an accurate difference in the depth of the reflecting horizon at the two points. Otherwise, erroneous results are obtained and invalid conclusions drawn. In California-type territories it is necessary to keep accurate information of the cross-line component of dip, as in such territories the dip is often high and the strike often changes rapidly along the line of exploration. Only in this way can accurate subsurface contouring be provided.

In order to make possible the accurate subsurface contouring of complex strata, we have modified our invention to provide accurate information of both the in-line and the cross-line components of dip simultaneously while carrying out continuous subsurface surveying. Some of these embodiments of our invention are illustrated in Figs. 7 and 17 to 22.

In Fig. 17 we have illustrated patterns in which there are shown continuous chains of receiving stations close enough together to provide positive identification of waves from trace to trace, and yet none of the receivers is so close to the generating station as to be seriously disturbed thereby, or so close for the "corona effect" to produce errors in the weathering corrections. If desired or necessary, a suitable chain of receivers may join $R_1$, $R_{25}$, $R_5$ and $R_{24}$. This pattern may be used in a variety of ways. In the most suitable procedure, that is, the one most accurate, recordings are made at a cross of receivers for each shot point. Shooting from $S_1$ we record at the receivers $R_{22}$ to $R_{29}$, as well as in accordance with the procedure for those receiving positions of Fig. 17 forming a pattern similar to those shown in Figs. 1 to 4 and 8 to 12.

A similar shot is taken at $S_2$.

As a result of this procedure, we get positive identification of waves from the same bed at all the receiving stations so that we are able to compute both the in-line and cross-line components of the dip of that portion of the bed returning waves to each receiving station. For the set-up for $S_1$ we can compute the in-line component of dip from the difference in travel times for the reflected wave at $R_1$ and $R_{14}$; and the cross-line component of dip may be computed from the difference in arrival times at $R_{22}$ and $R_{29}$. In such computations, appropriate account is of course taken of elevation corrections, weathering corrections, et al.

By our procedure we are thus aboe to compute the position of the reflecting horizon accurately for various shot points down the line, and thereby obtain a more complete and satisfactory geophysical picture than has been obtained heretofore.

In Fig. 18 is shown another embodiment of our invention, in which we obtain both in-line and cross-line components of dip simultaneously with conducting continuous subsurface exploration. Recording at $R_1$ to $R_{13}$, $R_{21}$ to $R_{25}$, and $R_{26}$ to $R_{30}$ for waves generated at $S_2$, and repeating the process similarly for other shot points down the line, we obtain the records desired. Using the time difference in arrivals at $R_1$ and $R_{13}$, the differences in arrivals at $R_4$ and $R_{25}$, and also the difference in arrivals at $R_{10}$ and $R_{30}$, the dip components may be computed and the position of the reflecting bed accurately located in space.

Using this technique is superior for certain purposes to using that described with Fig. 17. In the procedure suggested for use with Fig. 17 the cross-line component of dip of the portion of the bed reflecting waves to the spread extending across the line of exploration is obtained. Using the procedure suggested with Fig. 18, the cross-line component of dip at two parts of the reflecting horizon for each set-up is obtained. For the shot from $S_2$ we get the value of cross-line component of dip corresponding to the line of receptors $R_4$, $R_{21}$ ... $R_{25}$, and another value of the cross-line component of dip corresponding to the line of receptors $R_{10}$, $R_{26}$ ... $R_{30}$. This results is still more detailed information of subsurface conditions.

Figure 19:
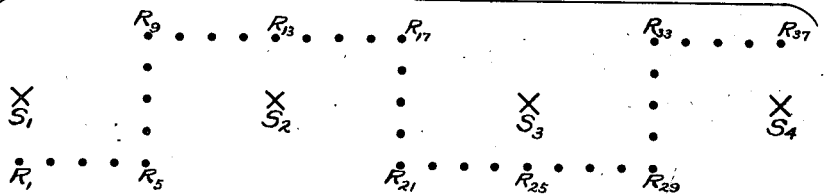
Figure 20:
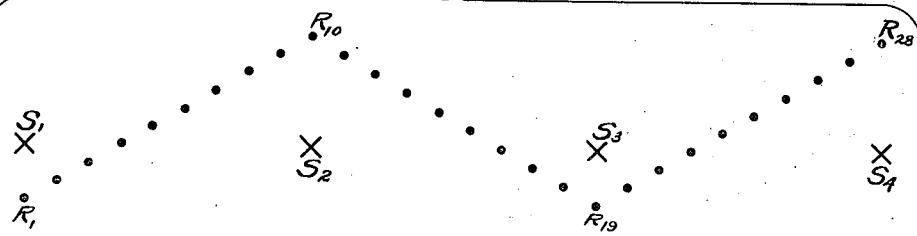
Figure 21:
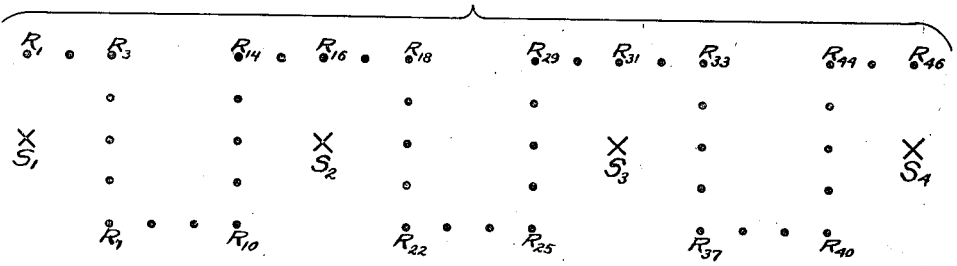

Figs. 19, 20 and 21 are further illustrations of continuous lines of receptors that may be used in connection with our invention. Though the patterns shown in Figs. 19 and 20 provide substantially continuous subsurface coverage only if the receptors opposite the generating points are very close to the generating point, say 50 or 100 feet, either of these patterns may be used for accurate subsurface contouring in rather simple territories when the character of the waves does not change rapidly from point to point.

In Fig. 21 we have illustrated a preferred pattern to be used with our method to obtain data for accurate subsurface contouring in highly complex territory. By weaving the chain of receptors back and forth across the line of exploration, as illustrated by this example, it is possible to determine changes in both in-line and cross-line components of dip within the portion of the subsurface that reflects waves to any chain of receptors recording the waves from any generating point.

Figure 22:
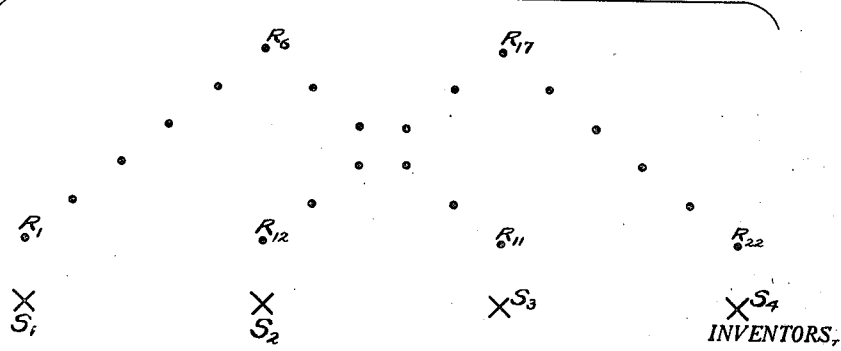

Figs. 7 and 22 illustrate still further modifications of our method for determining subsurface contours. In Fig. 22 the receiving stations $R_1$, $R_{11}$, $R_{12}$ and $R_{22}$ are placed near the generating stations but far enough therefrom to avoid the "corona effect." $R_1$ and $R_{11}$ are connected by a continuous chain of receivers; $R_{12}$ and $R_{22}$ by a second continuous chain. The receivers in each chain are placed far enough from any generating station used therewith to avoid the undesired noise and high amplitude ground vibration from the generator. In using the pattern shown in Fig. 22, waves arriving at the chain of receiving stations $R_1$ ... $R_6$ ... $R_{11}$ from $S_2$ may be recorded, and then the waves arriving at the receiving stations $R_{12}$ ... $R_{17}$ ... $R_{22}$. It is clear that a reflected wave generated at generating station $S_2$ and received at receptor station $R_{11}$ will be reflected from substantially the same point on a reflecting horizon as a reflected wave generated at generating station $S_3$ and received at receptor station $R_{12}$. It is also clear that these two waves will require substantially the same time to travel over their respective paths and that these paths will be of substantially the same length. Though this statement neglects the effect of differences in shot-hole depth, weathering thickness and small differences there might be in the surfaces distances $S$—$R_{12}$ and $S_3$—$R_{11}$, as well as deviations of the angles $S_2$—$S_3$—$R_{11}$ and $S_3$—$S_2$—$R_{12}$ from right angles and from each other, appropriate corrections may be made where necessary to assure positive identification of the waves on the two records reflected from the same horizon.

In Fig. 7 we have illustrated a preferred form of our invention for conducting continuous subsurface contouring. This pattern utilizes a line of receiving stations and a line of generating stations substantially parallel to each other, as in Fig. 14. Crossing said line of receiving stations near each generating station, but offset therefrom, there is a transverse line of receiving stations. Recording waves from $S_2$ at an adjacent parallel spread as $R_1$ ... $R_{13}$ and a transverse spread as $R_{33}$ ... $R_{44}$ simultaneously, and repeating the process for other generating stations along the line of exploration so as to obtain continuous identification of a subsurface bed, makes possible accurate subsurface contouring of said bed.

Now it is clear that the procedure to be used with any of the patterns of Figs. 7, and 17 to 22 may be varied in many ways. Records may be made unilaterally or bilaterally. Receivers may be placed opposite the shot points, or they may bracket points opposite the shot points, or placed in other suitable positions. The end reflecting points of the portion of the subsurface explored on each record may be identical with those from a record of waves from an adjacent portion of the subsurface, they may overlap, or they may fall just short of each other so that the portions of the reflecting horizon for successive set-ups have small gaps between them.

Groups of receivers may be placed at each receiving station to improve the type of record obtained. The distance from any receiver to the nearest generating station may vary over a wide range. Receiving stations may lie in straight, broken or curved lines. When applying our method to subsurface contouring, the value of the cross-line component of dip may be determined at various points on the line of exploration, or at every set-up.

The essential features of our invention are:

(a) The incidence points on the subsurface corresponding to traces on a given record should be close enough together to assure positive correlation of waves from the same bed from trace to trace.

(b) The successive portions of the subsurface should be at least contiguous to each other and preferably overlap to some extent. Whenever said successive portions do not overlap they should preferably be no further apart than incidence points on the portion reflecting waves to one record.

(c) The travel times of the waves incident on a given bed in the contiguous or overlapping portions of a reflecting horizon should be substantially the same.

(d) No receiver should be placed so close to the nearest generating station as to be disturbed by noise or heavy surface vibrations therefrom.

(e) When there is a possibility that the cross-line component of dip varies rapidly along the line of exploration, records should be made on transverse spreads simultaneously in order to assure obtaining the strike and dip of the same horizon which is being traced from record to record.

(f) The transverse lines should be part of or linked to the main chain of receivers.

(g) For most economical use of our method, any large number of receivers may be used, the more difficult the territory, the more complex the pattern, and hence the greater the number of receivers required.

For simplicity we have illustrated our method schematically in order to simplify the drawings and the discussion. For simplicity in explaining our invention it has been assumed that the reflecting bed was parallel to the surface. This was done for illustration only. Our method can be applied to territories of any dip whatever. While it is true that special methods of computation must be used in cases of high dips of say 40 degrees or more, and still more complicated computations made where the strata are overturned, nevertheless our method provides a simple and accurate method for obtaining the data required for such computations simultaneously with the identification of a given bed from one record to the next. The actual process of making such computations can be carried out by a person skilled in mathematics.

We claim:

1. In seismic prospecting involving generation of a first set of seismic waves in the earth at a shot point, the reception of this set of waves at a series of reception points in the earth spaced horizontally from each other and from the shot point, the generation of a second and later set of waves at a shot point in the earth, and the reception of this second set of waves at a series of reception points in the earth spaced from each other and from the shot point at which said waves are generated, the arrangement of shot point and reception points for the first set of waves being at least in part different from the arrangement of the shot point and reception points for the second set of waves, the improvement which comprises receiving both sets of waves at reception points which are spaced from both shot points, receiving in the first set a first plurality of waves after said waves have been reflected from one portion of a reflecting horizon in the earth, receiving in the second set a second plurality of waves after these waves have been reflected from a different portion of the reflecting horizon, and receiving in the first and second sets at least one reference wave reflected from substantially the same point on the reflecting horizon, said reference waves having travel paths from the generation point to reception point of substantially the same length.

2. In seismic prospecting involving generation of a first set of seismic waves in the earth at a shot point, the reception of this set of waves at a series of reception points in the earth spaced horizontally from each other and from the shot point, the generation of a second and later set of waves at a shot point in the earth, and the reception of this second set of waves at a series of reception points in the earth spaced from each other and from the shot point at which said waves are generated, the arrangement of shot point and reception points for the first set of waves being at least in part different from the arrangement of the shot point and reception points for the points for the second set of waves, the improvement which comprises generating the first set of waves at one point in the earth, generating the second and later set of waves at a different point in the earth, receiving both sets of waves at reception points which are spaced from both shot points, receiving in the first set a first plurality of waves after said waves have been reflected from one portion of a reflecting horizon in the earth, receiving in the second set a second plurality of waves after these waves have been reflected from a different portion of the reflecting horizon, and receiving in the first and second sets at least one reference wave reflected from substantially the same point on the reflecting horizon, said reference waves having travel paths from the generation point to reception point of substantially the same length.

3. In seismic prospecting involving generation of a first set of seismic waves in the earth at a shot point, the reception of this set of waves at a series of reception points in the earth spaced horizontally from each other and from the shot point, the generation of a second and later set of waves at a shot point in the earth, and the reception of this second set of waves at a series of reception points in the earth spaced from each other and from the shot point at which said waves are generated, the arrangement of shot point and reception points for the first set of waves being at least in part different from the arrangement of the shot point and reception point for the second set of waves, the improvement which comprises generating the first and second sets of waves at substantially the same point in the earth, receiving the first set of waves at a series of reception points in a line and at reception points offset from this line, receiving the second set of waves at a series of reception points in a second line extending in a different direction and at a reception point offset from this second line, receiving in the first set a first plurality of waves after said waves have been reflected from one portion of a reflecting horizon in the earth, receiving in the second set a second plurality of waves after these waves have been reflected from a different portion of the reflecting horizon, and receiving in the first and second sets at least one reference wave reflected from substantially the same point on the reflecting horizon, said reference waves having travel paths from the generation point to reception point of substantially the same length.

4. In geophysical prospecting in which two shot points are established in the earth's surface and seismic waves are generated successively at the two shot points, the steps which comprise generating a first set of waves at one shot point, receiving waves from this set at a series of reception points located at the surface of the earth and spaced horizontally from both shot points, the waves being received after the waves have been reflected from a first portion of a reflecting horizon, thereafter generating a second set of waves at the other shot point, receiving waves from this set at a series of reception points located at the surface of the earth and spaced horizontally from both shot points, the second set of waves being received after these waves have been reflected from a portion of the reflecting horizon contiguous to the first portion, at least one reflected wave of each set being received after reflection from substantially the same point on the reflecting horizon and after travel over a path of substantially the same length as a path of the reflected wave of the other set.

5. In reflection seismic prospecting involving the successive generation of sets of seismic waves at a series of shot points along a line of exploration and the reception of seismic waves of each set at a series of reception points spaced horizontally from each other and from the shot points after reflection of the waves from a series of points on a portion of a subsurface reflecting horizon, the steps which comprise receiving a reflected set of seismic waves generated at each shot point at a plurality of reception points in the earth's surface substantially in the line of shot points and between the shot point at which the waves are generated and a shot point next in the line of exploration and receiving seismic waves of the reflected set at reception points offset in the same direction from the line and adjacent the shot point at which the waves are generated and said next shot point, and receiving in the set of waves generated at one shot point a wave reflected from substantially the same point on the reflecting horizon as a received reflected wave generated at the shot point next in the line of exploration.

6. In reflection seismic prospecting in which sets of seismic waves are generated successively at two shot points in the earth and these waves are received at a plurality of spaced reception points after reflection from a reflecting horizon beneath the earth's surface, the improvement which comprises receiving a reflected set of seismic waves generated at one of said shot points at a plurality of reception points disposed in a line between the shot points and also at reception points adjacent the shot points but offset from the line on the same side thereof by about the same distance as that between adjacent reception points in the line, and thereafter receiving the reflected set of seismic waves generated at the other of said shot points at the same reception points, whereby at least one reflected wave of each set is received after reflection from substantially the same point on the reflecting horizon.

7. In reflection seismic prospecting in which seismic waves are generated successively at two shot points in the earth and these waves are received at a plurality of spaced reception points after reflection from a reflecting horizon beneath the earth's surface, the improvement which comprises receiving a reflected set of seismic waves generated at one of the shot points at a plurality of reception points disposed in a line between the shot points and also at a reception point offset from the line by about the same distance as that between adjacent reception points in the line and substantially opposite the other shot point, and thereafter receiving the set of reflected seismic waves generated at the other of said shot points at the same reception points in the line of shot points, and receiving in one set of waves at least one reference wave reflected from substantially the same point on the reflecting horizon as a reference wave received in the other set.

8. In reflection seismic prospecting in which sets of seismic waves are generated successively at two shot points in the earth, and these waves are received at a plurality of spaced reception points after reflection from a reflecting horizon beneath the earth's surface, the improvement which comprises receiving the set of reflected seismic waves generated at one of said shot points at a plurality of reception points disposed in a line between the shot points and at a reception point offset from the line about opposite the other shot point, thereafter receiving the set of reflected seismic waves generated at the other of said shot points at the same reception points in the line of shot points and at a reception point about opposite the first shot point and offset from the line on the same side of said line as the first offset reception point, the offset distance in both instances being about the same as the distance between adjacent reception points in the line, whereby there is received in each set at least one reference wave reflected from substantially the same point on the reflecting horizon.

9. In geophysical prospecting in which sets of seismic waves are generated successively at two horizontally spaced shot points in the earth, the improvement which comprises generating a set of waves at one of the shot points, receiving waves of the set generated at this shot point at a plurality of reception points at the earth's surface substantially in a line connecting the shot points and between the shot points and at a reception point offset from the line about opposite the other shot point by a distance about the same as that between adjacent reception points in the line, the waves being received after they are reflected from a series of incidence points on a first portion of a subsurface horizon, generating a set of waves at the other shot point, and receiving the waves of the set generated at said other shot point at the reception points in said line, these waves from the other shot point being received after reflection from a second series of incidence points on a portion of the subsurface horizon adjacent said first portion, at least one wave in each set being received after reflection from substantially the same incidence point.

HERBERT HOOVER, Jr.
CHARLES GILL MORGAN.
NORMAN J. CHRISTIE.